United States Patent
Mitsugi et al.

(10) Patent No.: US 10,766,804 B2
(45) Date of Patent: Sep. 8, 2020

(54) GLASS FILM PRODUCTION METHOD

(71) Applicant: Nippon Electric Glass Co., Ltd., Shiga (JP)

(72) Inventors: Kaoru Mitsugi, Shiga (JP); Naohiro Ikai, Shiga (JP); Shuji Akiyama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 180 days.

(21) Appl. No.: 16/302,300

(22) PCT Filed: Apr. 21, 2017

(86) PCT No.: PCT/JP2017/016116
§ 371 (c)(1),
(2) Date: Nov. 16, 2018

(87) PCT Pub. No.: WO2017/208677
PCT Pub. Date: Dec. 7, 2017

(65) Prior Publication Data
US 2019/0161385 A1  May 30, 2019

(30) Foreign Application Priority Data
May 31, 2016 (JP) .................. 2016-108678

(51) Int. Cl.
*C03B 33/023* (2006.01)
*C03B 33/08* (2006.01)
(Continued)

(52) U.S. Cl.
CPC ............ *C03B 33/082* (2013.01); *B23K 26/38* (2013.01); *B23K 26/402* (2013.01); *C03B 33/0235* (2013.01); *B23K 2103/54* (2018.08)

(58) Field of Classification Search
CPC . C03B 33/0222; C03B 33/0235; C03B 33/03; C03B 33/082
See application file for complete search history.

(56) References Cited

U.S. PATENT DOCUMENTS

2010/0107848 A1* 5/2010 Joseph, II ............... C03B 33/03
83/862
2012/0318024 A1 12/2012 Mori et al.
(Continued)

FOREIGN PATENT DOCUMENTS

JP 8-141764 6/1996
JP 2012-240883 12/2012
(Continued)

OTHER PUBLICATIONS

English Translation of International Preliminary Report on Patentability dated Dec. 4, 2018 in International (PCT) Application No. PCT/JP2017/016116.
(Continued)

*Primary Examiner* — Cynthia Szewczyk
(74) *Attorney, Agent, or Firm* — Wenderoth, Lind & Ponack, L.L.P.

(57) ABSTRACT

A conveying device (14) for a glass film (G) includes: a first support (21) configured to support a first portion (Gc) of the glass film (G) having been cut; a second support (22) configured to support a second portion (Gd) of the glass film (G) having been cut; and an opening (23) formed at a position between the first support (21) and the second support (22) and below a laser irradiation apparatus (19). A cutting step for the glass film (G) includes deforming the glass film (G) so as to be convex downward through the opening (23), and radiating a laser beam (LB) from the laser irradiation apparatus (19) to a position which is within a
(Continued)

range of the opening (23), and which is prevented from coinciding with a top (GT) of the glass film (G).

6 Claims, 11 Drawing Sheets

(51) Int. Cl.
  *B23K 26/38* (2014.01)
  *B23K 26/402* (2014.01)
  *B23K 103/00* (2006.01)

(56) References Cited

U.S. PATENT DOCUMENTS

| | | | |
|---|---|---|---|
| 2013/0122264 A1 | 5/2013 | Fujii et al. | |
| 2014/0130649 A1* | 5/2014 | Chang | C03B 33/0235 83/26 |
| 2015/0251944 A1* | 9/2015 | Brackley | C03B 33/033 83/23 |
| 2015/0299019 A1* | 10/2015 | Fujii | C03B 35/167 65/53 |
| 2016/0280581 A1 | 9/2016 | Fujii et al. | |

FOREIGN PATENT DOCUMENTS

| | | | |
|---|---|---|---|
| JP | 2015-140279 | 8/2015 | |
| JP | 2016155716 A * | 9/2016 | B28D 1/22 |
| WO | 2013/039229 | 3/2013 | |
| WO | 2014/192482 | 12/2014 | |

OTHER PUBLICATIONS

International Search Report dated Jun. 20, 2017 in International Application No. PCT/JP2017/016116.

* cited by examiner

Fig. 11 ment of the present invention, it is desired that the
GLASS FILM PRODUCTION METHOD

TECHNICAL FIELD

The present invention relates to a method of producing a glass film which can be taken up into, for example, a roll shape.

BACKGROUND ART

As is well known, thinning of glass sheets to be used in flat panel displays (FPD), such as a liquid crystal display, a plasma display, and an OLED display, glass sheets to be used in OLED illumination, glass sheets to be used for producing a tempered glass that is a component of a touch panel, and the like, and glass sheets to be used in panels of solar cells, and the like has been promoted in the current circumstances.

For example, in Patent Literature 1, there is disclosed a glass film (thin sheet glass) having a thickness of several hundred micrometers or less. As described also in this literature, this kind of glass film is generally obtained through continuous forming with a forming device employing a so-called overflow down-draw method.

For example, an elongated glass film obtained by the continuous forming by the overflow down-draw method is changed in its conveying direction from a vertical direction to a horizontal direction, and is then continuously conveyed to a downstream side with a lateral conveying unit (horizontal conveying unit) of a conveying device. In the process of the conveyance, both end portions (selvage portions) of the glass film in a width direction are cut and removed. After that, the glass film is taken up into a roll shape with a take-up roller. Thus, a glass roll is formed.

In Patent Literature 1, as a method of cutting both the end portions of the glass film in the width direction, laser cleaving is disclosed. The laser cleaving involves forming an initial crack on the glass film by crack forming means, such as a diamond cutter, and then irradiating the portion with a laser beam to heat the portion, followed by cooling the heated portion by cooling means to develop the initial crack through a thermal stress generated in the glass film, to thereby cut the glass film.

Figure 10A:
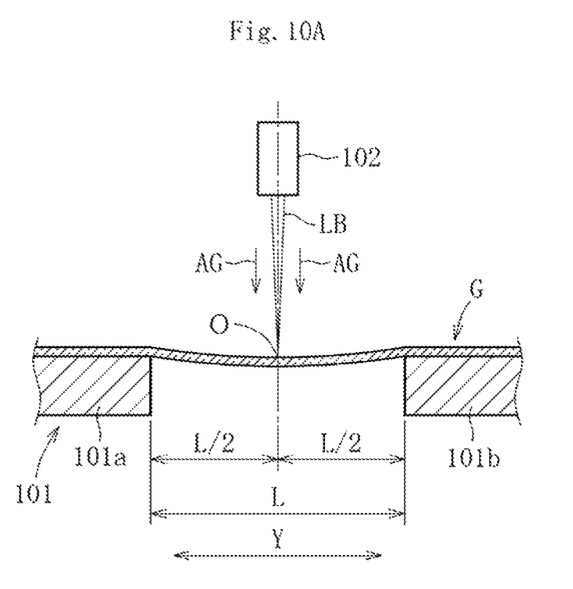
FIG. 10A is a sectional view of a glass film for illustrating a peeling phenomenon.
Figure 11:
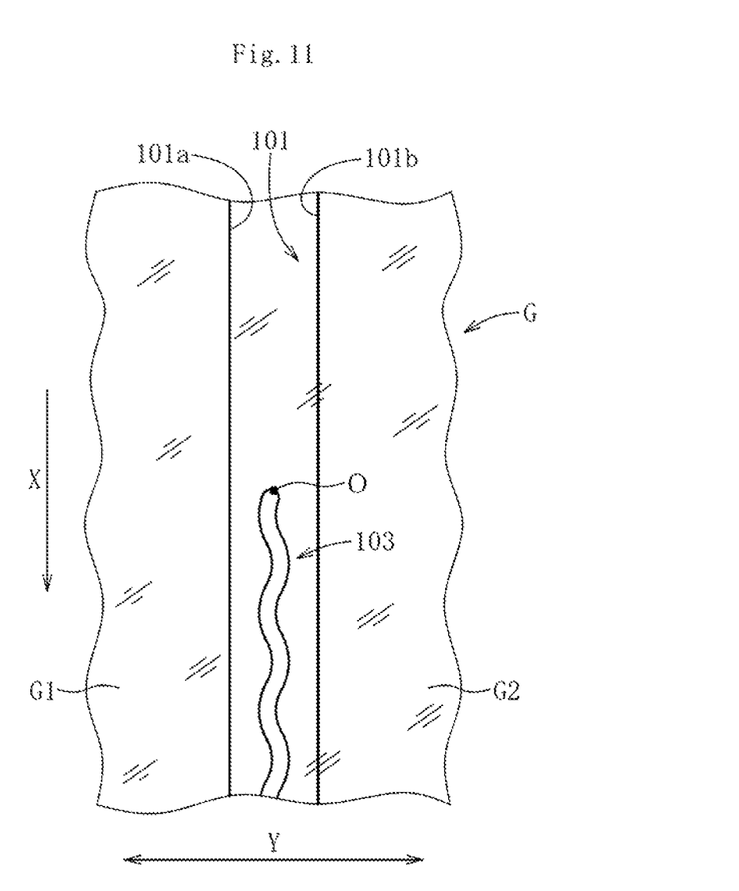
FIG. 11 is a plan view for illustrating a process of melt-cutting of the glass film.

As another cutting method, there is used laser melt-cutting involving radiating a laser beam to a glass film to melt-cut part of the glass film. As illustrated in FIG. 10A and FIG. 11, in the laser melt-cutting, while a glass film G is conveyed in a predetermined direction (in the direction represented by the symbol "X" in FIG. 11) with a conveying device 101, a laser beam LB is radiated to a predetermined position (irradiation position) O of the glass film G from a laser irradiation apparatus 102.

The conveying device 101 includes a first conveying body 101a and a second conveying body 101b arranged so as to be spaced apart from each other. The irradiation position O with the laser beam LB is set between the first conveying body 101a and the second conveying body 101b. An assist gas AG is blown toward the glass film G so that molten glass is prevented from scattering and remaining as dross.

Figure 10B:
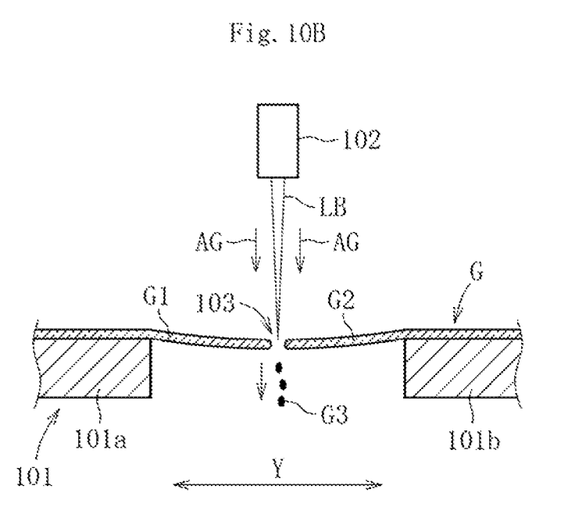
FIG. 10B is a sectional view of the glass film for illustrating the peeling phenomenon.

As illustrated in FIG. 10B, through irradiation with the laser beam LB, the glass film G is melt-cut into a first portion G1 and a second portion G2. Molten glass G3 generated through the melt-cutting falls into a space between the first conveying body 101a and the second conveying body 101b, and collected at a bottom of the space.

CITATION LIST

Patent Literature 1: JP 2012-240883 A

SUMMARY OF INVENTION

Technical Problem

In this connection, the inventors of the present invention have made extensive investigations aimed at cutting a glass film with high accuracy through utilization of laser melt-cutting, and as a result, have found the following problem. Specifically, as illustrated in FIG. 10A, when a distance between the first conveying body 101a and the second conveying body 101b in a width direction Y of the glass film G is defined as L, the laser beam LB is radiated to a middle position between the first conveying body 101a and the second conveying body 101b (a position of L/2 from each of the conveying bodies 101a and 101b). It has been found that, when the laser beam LB is radiated in such a manner, a melt-cut portion 103 is not formed into a linear shape, but is formed so as to meander as illustrated in FIG. 11. When the melt-cut portion 103 meanders as described above, a cut surface with high accuracy cannot be obtained.

The present invention has been made in view of the above-mentioned circumstances, and an object of the present invention is to provide a method of producing a glass film capable of cutting a glass film with high accuracy through utilization of laser melt-cutting.

Solution to Problem

As a measure to achieve the above-mentioned object, according to one embodiment of the present invention, there is provided a method of producing a glass film, comprising: a conveying step of conveying a band-like glass film in a predetermined direction with a conveying device; and a cutting step of melt-cutting the glass film into a first portion and a second portion with a cutting portion while conveying the glass film by the conveying step, the cutting portion comprising: a laser irradiation apparatus; a first support configured to support the first portion; a second support configured to support the second portion; and an opening formed at a position between the first support and the second support and below the laser irradiation apparatus, the cutting step comprising deforming the glass film so as to be convex downward through suction at the opening, and radiating a laser beam from the laser irradiation apparatus to a position which is within a range of the opening, and which is prevented from coinciding with a top of the glass film.

According to the finding made by the inventors of the present invention, it has been found that, when the glass film is deformed so as to be convex downward while being conveyed, the top of the glass film shifts in a lateral direction under the influence of the conveyance. It is considered that the melt-cut portion of the glass film meanders because the laser beam is radiated to a position within a shift range of the top. According to the embodiment of the present invention, when the glass film is deformed so as to be convex downward through suction at the opening, the laser beam is radiated to a position which is outside the shift range of the top, and which is prevented from coinciding with the top of the glass film having been deformed, and hence the occurrence of the meandering of the melt-cut portion can be prevented, and the glass film can be cut with high accuracy.

In the method of producing a glass film according to the embodiment of the present invention, it is desired that the conveying device comprise a surface plate including the first support, the second support, and the opening, and the cutting step comprise deforming the glass film so as to be convex downward through suction at the opening.

In the course of conveyance, the glass film tends to have wrinkles in part thereof. When a portion in which the wrinkles are formed is melt-cut, a cut surface with high accuracy cannot be obtained. According to the embodiment of the present invention, the glass film is deformed so as to be convex downward and the wrinkles are relieved by using the opening of the surface plate as a suction hole, and hence the glass film can be cut (melt-cut) with high accuracy.

In the method of producing a glass film according to the embodiment of the present invention, it is desired that the first portion serve as a non-product portion, and the second portion serve as a product portion, and an irradiation position of the glass film with the laser beam be offset to a position which is on a first support side, and which is prevented from coinciding with the top of the glass film. As described above, when the laser beam is radiated to a position which is outside the shift range of the top, and which is prevented from coinciding with the top of the glass film having been deformed, the occurrence of the meandering of the melt-cut portion can be prevented, and the glass film can be cut with high accuracy. In addition, an effective width of the product portion can be increased.

In the method of producing a glass film according to the embodiment of the present invention, it is desired that, when a distance between the first support and the irradiation position of the glass film with the laser beam is defined as L1, and a distance between the second support and the irradiation position of the glass film with the laser beam is defined as L2, the L1 and the L2 be set so as to satisfy the following expression: L1:L2=3:7 to 4.5:5.5. With this, the occurrence of the meandering of the melt-cut portion caused by irradiation with the laser beam can be reliably prevented, and the glass film can be cut with high accuracy.

In the method of producing a glass film according to the embodiment of the present invention, it is desired that the cutting step further comprise, after the melt-cutting the glass film with the laser beam, generating thread-like peeled materials from an end portion of the first portion in a width direction and an end portion of the second portion in a width direction. When the thread-like peeled materials are generated from the first portion and the second portion, cut surfaces of the first portion and the second portion to be formed thereafter can be formed uniformly with high accuracy.

In the method of producing a glass film according to the embodiment of the present invention, it is desired that the second support be configured to support the product portion at a higher position than the first support. With this, the product portion of the glass film supported by the second support is supported at a higher position than the non-product portion supported by the first support. Accordingly, with such positional relationship, the thread-like peeled material generated from the non-product portion is encouraged to move below the product portion. Accordingly, the thread-like peeled material generated from the non-product portion is prevented from being brought into contact with an upper surface of the product portion, and thus the product portion can be prevented from being damaged.

Advantageous Effects of Invention

According to the present invention, the glass film can be cut with high accuracy through utilization of laser melt-cutting.

DESCRIPTION OF EMBODIMENTS

Now, an embodiment of the present invention is described with reference to the drawings. In each of FIG. 1 to FIG. 5, a first embodiment of each of a method of producing a glass film and an apparatus for producing a glass film according to the present invention is illustrated.

Figure 1:
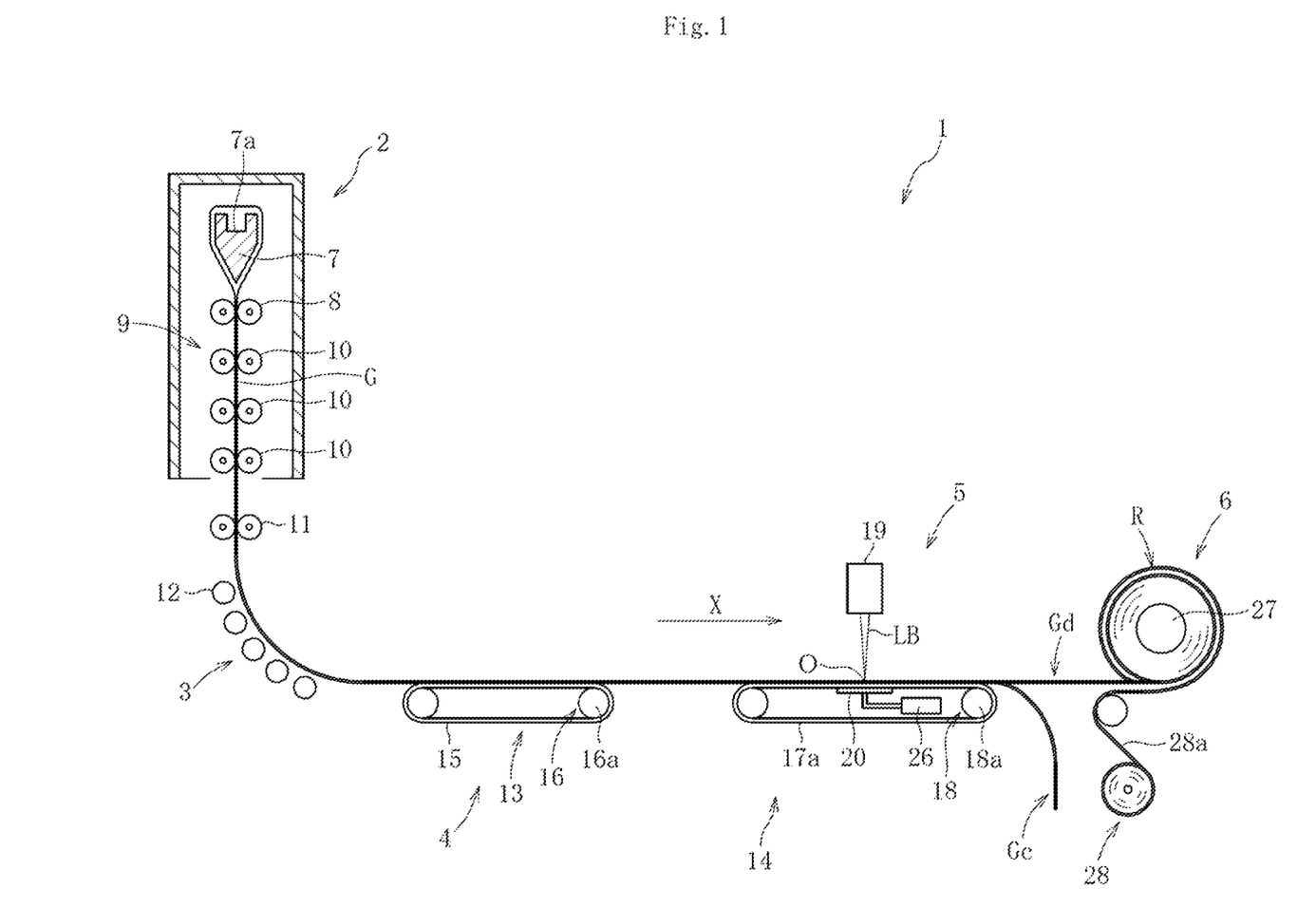
FIG. 1 is a side view for illustrating an overall configuration of an apparatus for producing a glass film according to a first embodiment.

FIG. 1 is a schematic side view for schematically illustrating an overall configuration of an apparatus for producing a glass film. As illustrated in FIG. 1, a production apparatus 1 comprises: a forming portion 2 configured to form a glass film G; a direction conversion portion 3 configured to convert a traveling direction of the glass film G from a vertically downward direction to a lateral direction X; a lateral conveying portion 4 configured to convey the glass film G in the lateral direction X after the direction conversion; a cutting portion 5 configured to cut end portions (selvage portions) Ga and Gb of the glass film G in a width direction as non-product portions Gc while the glass film G is conveyed in the lateral direction X with the lateral conveying portion 4; and a take-up portion 6 configured to take up a product portion Gd into a roll shape to form a glass roll R, the product portion Gd being obtained by cutting and removing the non-product portions Gc with the cutting portion 5. In this embodiment, the thickness of the product portion Gd is set to 300 µm or less, preferably 100 µm or less.

The forming portion 2 comprises; a forming body 7 having a substantially wedge shape in a sectional view in which an overflow groove 7a is formed on an upper end portion thereof; cooling rollers 8 arranged immediately below the forming body 7 and configured to sandwich both end portions of molten glass in a width direction, the molten glass overflowing from the forming body 7, from both front and back surface sides thereof; and an annealer 9 arranged immediately below the cooling rollers 8.

The forming portion 2 is configured to cause the molten glass overflowing from an upper portion of the overflow groove 7a of the forming body 7 to flow down along both side surfaces of the forming body 7 to be joined at a lower end of the forming body 7, to thereby form a molten glass in a film shape. The cooling rollers 8 are configured to control shrinkage of the molten glass in a width direction to form the glass film G having a predetermined width. The annealer 9 is configured to perform strain removal treatment on the glass film G. The annealer 9 comprises annealer rollers 10 arranged in a plurality of stages in a vertical direction.

Support rollers 11 configured to sandwich both end portions of the glass film G in a width direction from both the front and back surface sides are arranged below the annealer 9. A tension is applied to the glass film G between the support rollers 11 and the cooling rollers 8 or between the support rollers 11 and the annealer rollers 10 at any one position.

The direction conversion portion 3 is arranged at a position below the support rollers 11. In the direction conversion portion 3, a plurality of guide rollers 12 configured to guide the glass film G are arranged in a curved form. Those guide rollers 12 are configured to guide the glass film G, which has been conveyed in the vertical direction, in the lateral direction.

The lateral conveying portion 4 is arranged in a forward traveling direction with respect to (on a downstream side of) the direction conversion portion 3. The lateral conveying portion 4 comprises: a first conveying device 13; and a second conveying device 14. The first conveying device 13 is arranged on a downstream side of the direction conversion portion 3, and the second conveying device 14 is arranged on a downstream side of the first conveying device 13.

The first conveying device 13 comprises: an endless belt-like conveyor belt 15; and a driver 16 for the conveyor belt 15. The first conveying device 13 is configured to continuously convey the glass film G having passed through the direction conversion portion 3 to a downstream side by bringing an upper surface of the conveyor belt 15 into contact with the glass film G. The driver 16 comprises: a driving body 16a for driving the conveyor belt 15, such as a roller or a sprocket; and a motor (not shown) configured to rotate the driving body 16a.

Figure 2:
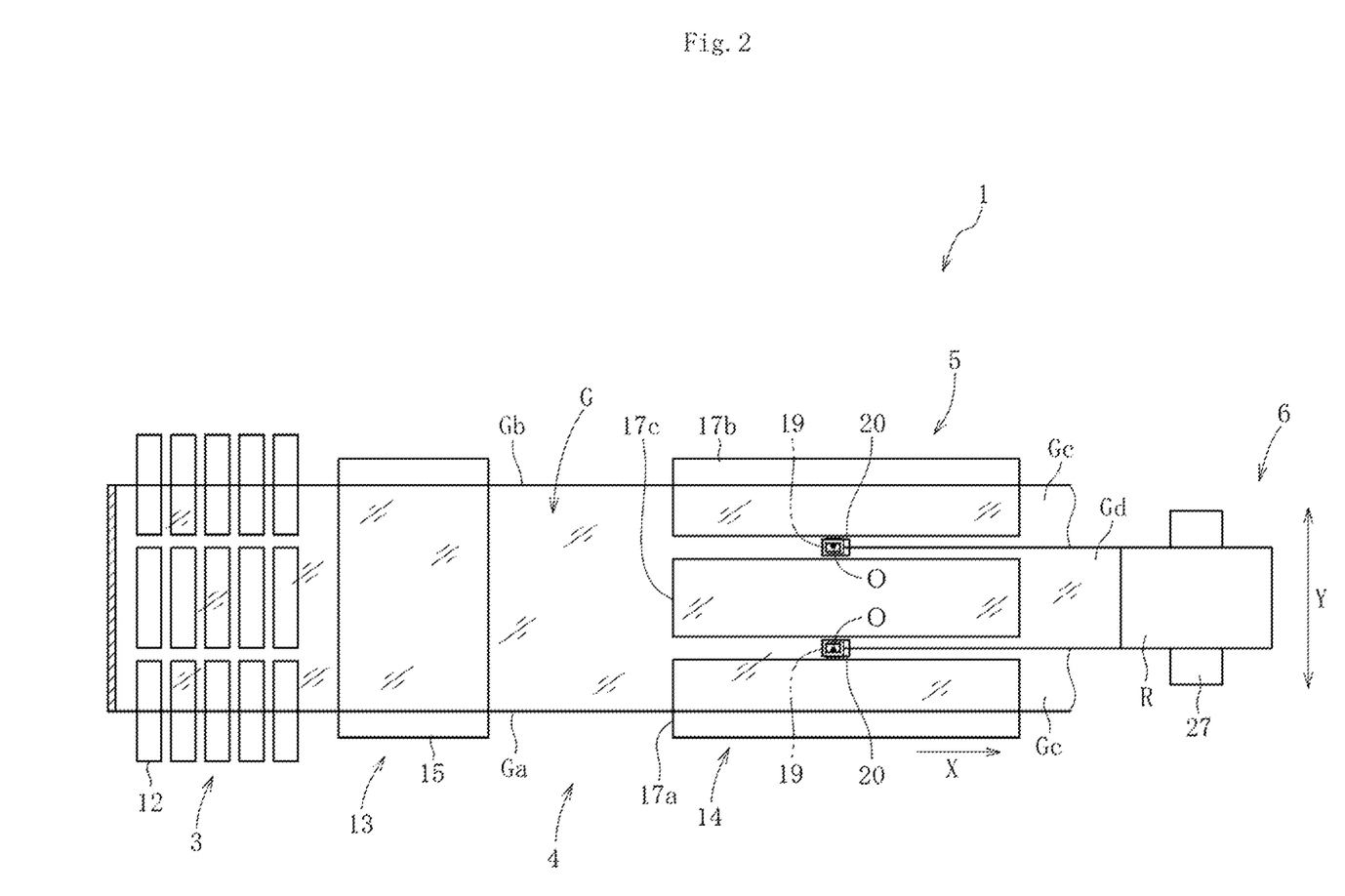
FIG. 2 is a plan view for illustrating a main portion of the apparatus for producing a glass film.

The second conveying device 14 is a component of the cutting portion 5. The second conveying device 14 comprises: a plurality of (in this example, three) conveyor belts 17a to 17c each configured to convey the glass film G; and a driver 18 for the conveyor belts 17a to 17c. As illustrated in FIG. 2, the conveyor belts 17a to 17c include: the first conveyor belt 17a to be brought into contact with the one end portion Ga of the glass film G in the width direction; the second conveyor belt 17b to be brought into contact with the other end portion Gb of the glass film G in the width direction; and the third conveyor belt 17c to be brought into contact with a middle portion of the glass film G in the width direction. The driver 18 comprises: a driving body 18a for driving the conveyor belts 17a to 17c, such as a roller or a sprocket; and a motor (not shown) configured to rotate the driving body 18a.

As illustrated in FIG. 2, the conveyor belts 17a to 17c are arranged so as to be spaced apart from one another in the width direction Y of the glass film G. With this, gaps are formed between the first conveyor belt 17a and the third conveyor belt 17c and between the second conveyor belt 17b and the third conveyor belt 17c.

Figure 3:
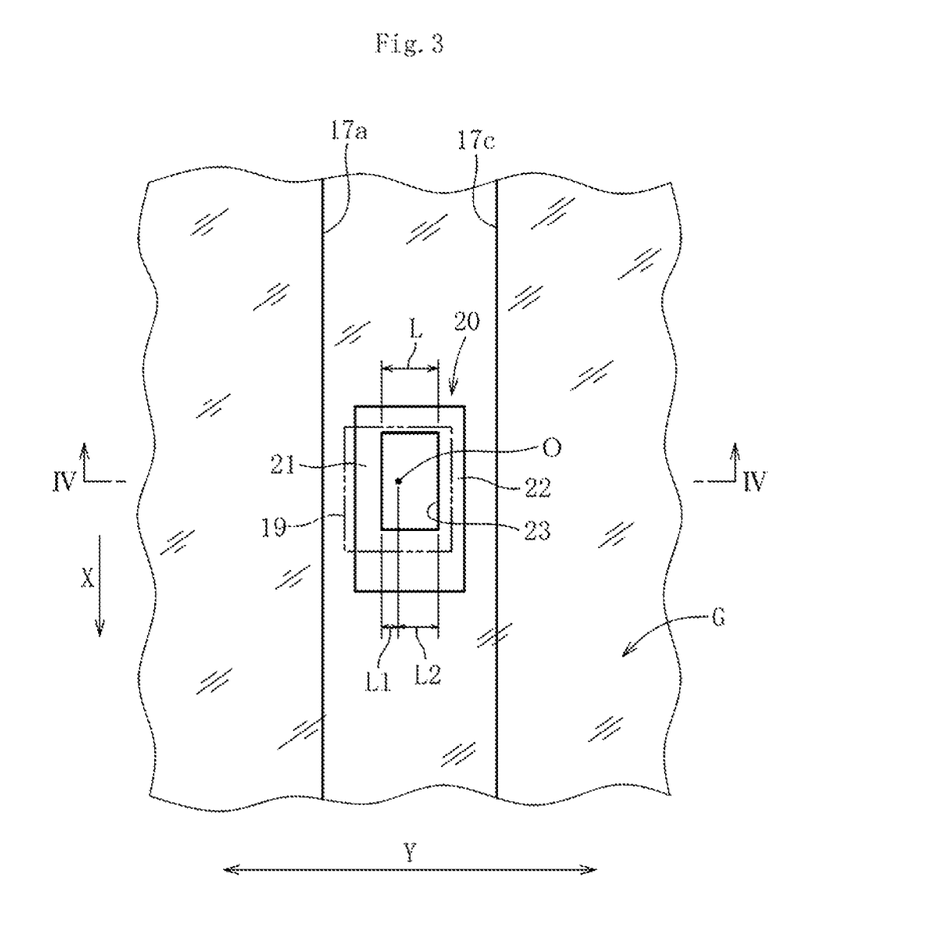
FIG. 3 is a plan view of a surface plate of a cutting portion.

As illustrated in FIG. 1 to FIG. 3, the cutting portion 5 comprises, in addition to the second conveying device 14: a laser irradiation apparatus 19 arranged at a position above the second conveying device 14; and a surface plate 20 configured to support part of the glass film G.

The laser irradiation apparatus 19 has a configuration in which the laser beam LB, such as a $CO_2$ laser, a YAG laser, or any other laser, is radiated downward. The laser beam LB is radiated to a predetermined position (irradiation position) O of the glass film G. In this embodiment, two laser irradiation apparatus 19 are arranged so that both the end portions Ga and Gb of the glass film G in the width direction are cut. As illustrated in FIG. 2, the irradiation positions O with the laser beam LB are set so as to correspond to the gap between the first conveyor belt 17a and the third conveyor belt 17c and the gap between the second conveyor belt 17b and the third conveyor belt 17c in the second conveying device 14.

Figure 4:
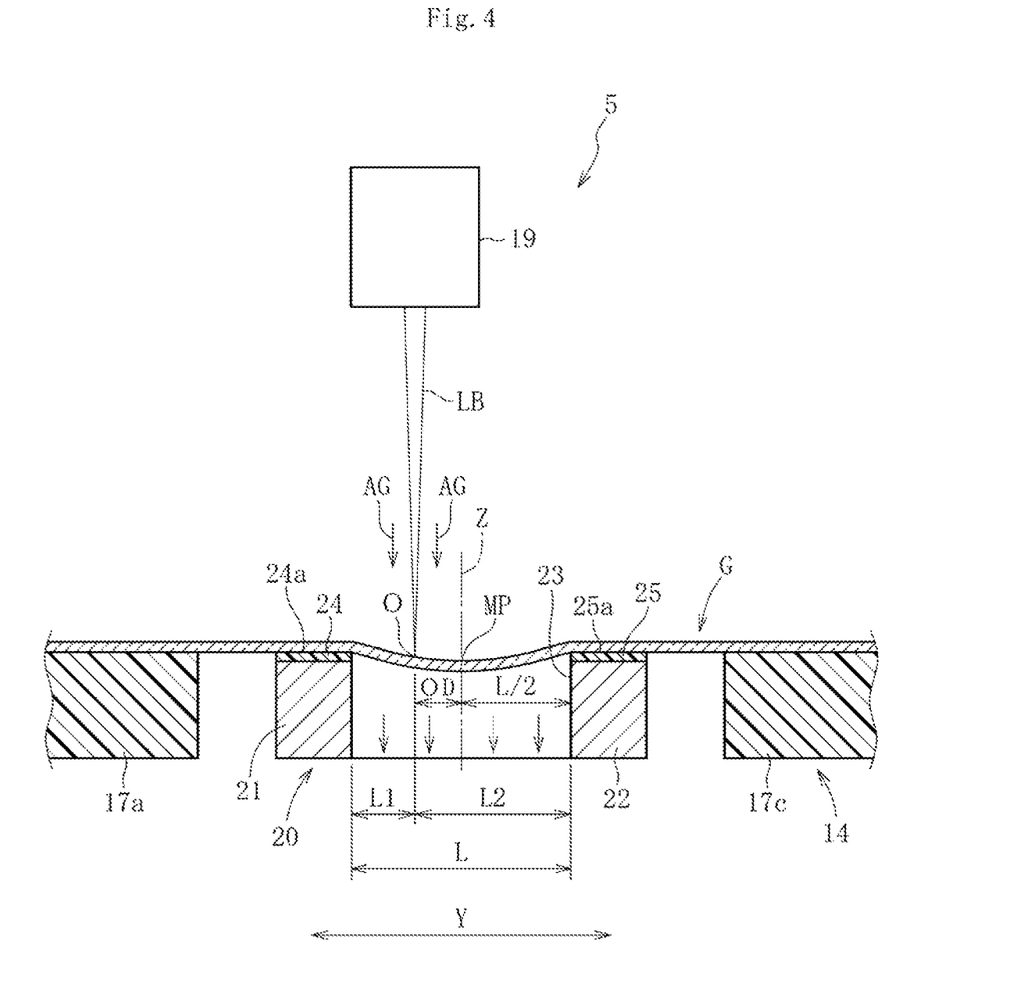
FIG. 4 is a sectional view taken along the line IV-IV of FIG. 3.

As illustrated in FIG. 3 and FIG. 4, the surface plate 20 is arranged at a position below the laser irradiation apparatus 19. In this embodiment, two surface plates 20 corresponding to the two laser irradiation apparatus 19 are arranged. Of those, one of the surface plates 20 is arranged at the gap between the first conveyor belt 17a and the third conveyor belt 17c of the second conveying device 14. The other one of the surface plates 20 is arranged at the gap between the second conveyor belt 17b and the third conveyor belt 17c.

The surface plate 20 is made of a metal, and comprises: a first support 21 configured to support the non-product portion Gc; a second support 22 configured to support the product portion Gd; and an opening 23 formed between the first support 21 and the second support 22.

The first support 21 and the second support 22 comprise resin sheets 24 and 25 on upper portions thereof, respectively. With the resin sheets 24 and 25, the first support 21 and the second support 22 are configured to allow easy sliding of part of the glass film G passing over the surface plate 20. The first support 21 is configured to support the glass film G (non-product portion Gc) with an upper surface 24a of the resin sheet 24, which is provided on the first support 21. The upper surface 24a is hereinafter referred to as "support surface" of the first support 21. Similarly, an upper surface 25a of the resin sheet 25, which is provided on the second support 22, serves as a support surface configured to support the glass film G (product portion Gd).

The opening 23 has predetermined width and length dimensions, and is formed into an elongated shape along a conveyance direction X of the glass film G. The opening 23 is formed as a hole vertically penetrating through the surface plate 20. A suction pump 26 is connected to the opening 23. With such configuration, the opening 23 functions as a suction hole configured to suction the glass film G passing over the surface plate 20.

As illustrated in FIG. 3 and FIG. 4, the laser irradiation apparatus 19 is arranged above the opening 23. With this, the laser irradiation apparatus 19 can radiate the laser beam LB to the glass film G within a range of the opening 23.

As illustrated in FIG. 4, an irradiation position O of the glass film G with the laser beam LB is offset to a position on a first support 21 side with respect to a middle position MP between the first support 21 and the second support 22. With regard to the offsetting, when a distance between the first support 21 and the irradiation position O of the glass film G with the laser beam LB is defined as L1, and a distance between the second support 22 and the irradiation position O of the glass film G with the laser beam LB is defined as L2, the L1 and the L2 are desirably set so as to satisfy the following expression: L1<L2. More specifically, the L1 and the L2 are desirably set so as to satisfy the following expression: L1:L2=3:7 to 4.5:5.5. Alternatively, the L1 and the L2 are desirably set so as to satisfy the following expression: L1/L2=0.42 to 0.82. A distance L (L=L1+L2) between the first support 21 and the second support 22, which are spaced apart from each other across the opening 23, is desirably set to about 20 mm, but is not limited thereto.

The take-up portion 6 is arranged on a downstream side of the cutting portion 5 and the second conveying device 14. The take-up portion 6 comprises: a take-up roller 27; a motor (not shown) configured to rotationally drive the take-up roller 27; and a protective sheet supply portion 28 configured to supply a protective sheet 28a to the take-up roller 27. The take-up portion 6 is configured to take up the product portion Gd into a roll shape by rotating the take-up roller 27 with the motor while causing the protective sheet 28a supplied from the protective sheet supply portion 28 to overlap the product portion Gd. The product portion Gd having been taken up forms the glass roll R.

A method of producing the glass film G (glass roll R) using the production apparatus 1 having the above-mentioned configuration is described below.

The method of producing the glass film G comprises: a forming step of forming the band-like glass film G with the forming portion 2; a conveying step of conveying the glass film G with the direction conversion portion 3 and the lateral conveying portion 4; a cutting step of cutting the end portions Ga and Gb of the glass film G in the width direction with the cutting portion 5; and a take-up step of collecting the product portion Gd with the take-up portion 6 after the cutting step.

In the forming step, molten glass overflowing from an upper portion of the overflow groove 7a of the forming body 7 in the forming portion 2 is caused to flow down along both side surfaces of the forming body 7 to be joined at a lower end of the forming body 7, to thereby form the molten glass into a film shape. At this time, the shrinkage of the molten glass in a width direction is controlled with the cooling rollers 8, and thus the glass film G having a predetermined width is formed. After that, strain removal treatment is performed on the glass film G with the annealer 9. The glass film G having a predetermined thickness is formed through a tension applied by the annealer rollers 10 and the support rollers 11.

In the conveying step, the conveying direction of the glass film G is converted to a lateral direction X with the direction conversion portion 3, and the glass film G is conveyed to the take-up portion 6 on a downstream side with the conveying devices 13 and 14.

In the cutting step, while the glass film G is conveyed with the second conveying device 14, the glass film G is irradiated with the laser beam LB from the laser irradiation apparatus 19 of the cutting portion 5, and both the end portions Ga and Gb of the glass film G in the width direction are cut. With this, the glass film G is separated into the non-product portions Gc and the product portion Gd.

Specifically, in the cutting step, the laser beam LB is radiated to the glass film G passing over the opening 23 of the surface plate 20 from the laser irradiation apparatus 19. Part of the glass film G passing over the surface plate 20 is suctioned into the opening 23 by the action of the suction pump 26. At this time, the first support 21 and the second support 22 of the surface plate 20 slidably support the glass film G with the support surfaces 24a and 25a, respectively.

As illustrated in FIG. 4, the glass film G passing over the opening 23 is deformed so as to be convex downward by being supported by the support surface 25a of the first support 21 and the support surface 25a of the second support 22 and further suctioned through the opening 23.

Figure 5A:
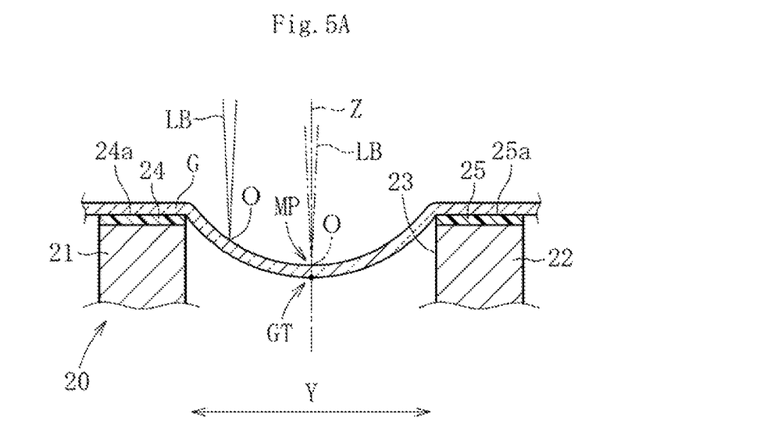
FIG. 5A is a sectional view for illustrating a mechanism for meandering of a melt-cut portion of a glass film.
Figure 5B:
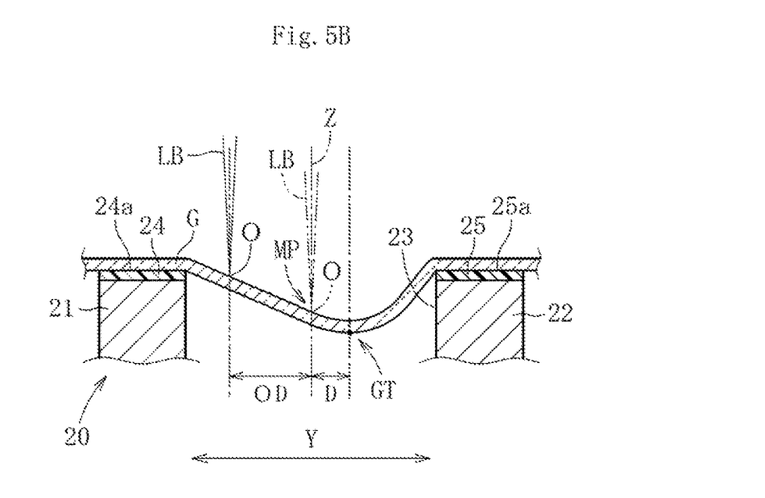
FIG. 5B is a sectional view for illustrating the mechanism for meandering of the melt-cut portion of the glass film.
Figure 5C:
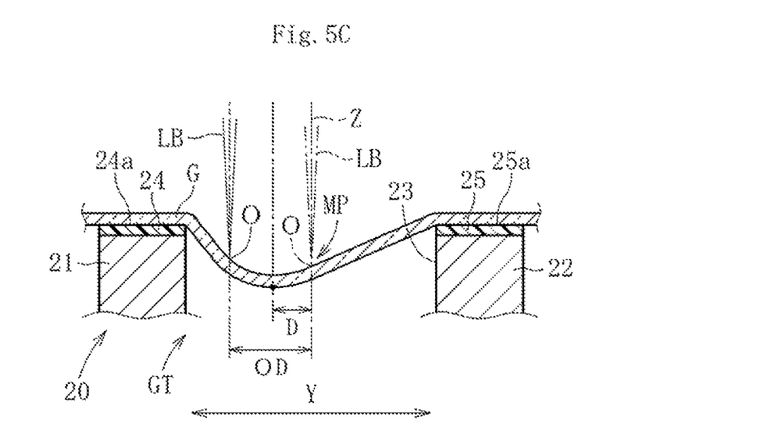
FIG. 5C is a sectional view for illustrating the mechanism for meandering of the melt-cut portion of the glass film.

A top GT of the glass film G deformed into a convex shape shifts in position under the influence of conveyance. Now, a shift in position of the top GT of the glass film G in the cutting step is described with reference to FIG. 5. As illustrated in FIG. 5A, the glass film G supported by the first support 21 and the second support 22 of the surface plate 20 is deformed so as to be convex downward at the opening 23 therebetween. In FIG. 5A, a case in which the top GT of the glass film G deformed into a convex shape does not shift in position, and is positioned on a middle line Z passing the middle position MP between the first support 21 and the second support 22 of the surface plate 20 is illustrated.

As described above, when a state in which the top GT of the glass film G coincides with the middle line Z can be maintained, a melt-cut portion (29) does not meander even in the case in which the laser beam LB is radiated to the middle position MP between the first support 21 and the second support 22 to melt-cut the glass film G.

However, according to the finding made by the inventors of the present invention, it has been found that the glass film G is irregularly deformed under the influence of conveyance. For example, as illustrated in FIG. 5B, the glass film G may be deformed so that the top GT thereof shifts to a right side of the middle line Z. Alternatively, as illustrated in FIG. 5C, the glass film G may be deformed so that the top GT thereof shifts to a left side of the middle line Z. As described above, the glass film G is deformed so that the top GT thereof shifts in the width direction Y of the glass film G within a range of the opening 23. In each of FIG. 5A to FIG. 5C, the degree of deformation of the glass film G is illustrated in an exaggerated manner in order to describe the cause of the meandering clearly.

It is presumed that the melt-cut portion meanders (see FIG. 11) because the laser beam LB represented by the dashed two dotted line is continuously radiated to the middle position MP despite the fact that the glass film G is deformed so that the top GT thereof shifts as described above.

In contrast to this, in Example, as represented by the solid line of each of FIG. 5A to FIG. 5C, the irradiation position O of the glass film G with the laser beam LB is offset to a position on the first support 21 side with respect to the middle position MP. That is, the laser beam LB is not targeted at the top GT of the glass film G deformed so as to be convex downward, and is radiated to a position which is outside a shift range of the top GT and corresponds to a highly inclined region in a portion deformed into a convex shape.

In this case, as illustrated in each of FIG. 5B and FIG. 5C, an offset amount (distance) OD of the laser beam LB from the middle position MP between the first support 21 and the second support 22 is set to be larger than a shift range (maximum shift distance) D of the top GT from the middle position MP (OD>D). With this, the influence of the lateral shifting of the top GT can be reduced to the extent possible in the glass film G, and the meandering of a melt-cut portion 29 can be suppressed.

Figure 6:
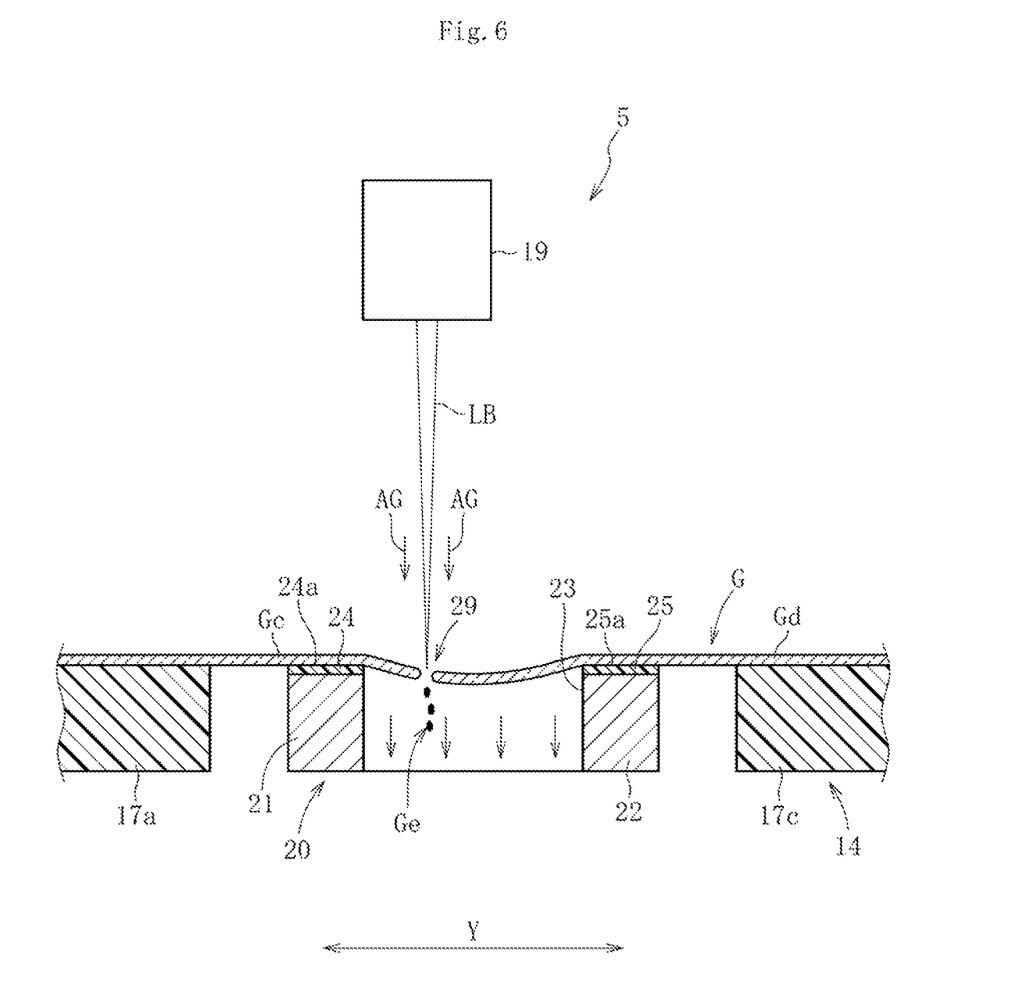
FIG. 6 is a sectional view for illustrating a state in which the glass film is melt-cut.

Under the state in which the glass film G is deformed as described above, the laser beam LB is radiated from the laser irradiation apparatus 19 to the irradiation position O of the glass film G. As already described, the irradiation position O is offset to a position which is outside the shift range D of the top GT of the glass film G deformed into a convex shape and is on the first support 21 side with respect to the middle position MP. When the laser beam LB is radiated to the irradiation position O, the glass film G is melt-cut into the non-product portion Gc and the product portion Gd as illustrated in FIG. 6. In this case, the melt-cut portion 29 of the glass film G linearly develops along the conveyance direction X of the glass film G without meandering. Molten glass Ge generated through melt-cutting is suctioned through the opening 23, and collected at a bottom of the opening 23. An assist gas AG is blown toward the glass film G so that the molten glass Ge is prevented from scattering and adhering to a lens of the laser irradiation apparatus 19 as dross.

The non-product portions Gc are conveyed to a downstream side with the first conveyor belt 17a and the second conveyor belt 17b of the second conveying device 14, and collected on an upstream side of the take-up portion 6 with a collecting device not shown in the figures.

In the take-up step, the product portion Gd having been conveyed with the second conveying device 14 is taken up into a roll shape with the take-up roller 27 of the take-up portion 6 while the protective sheet 28a is supplied to the product portion Gd from the protective sheet supply portion 28. When the product portion Gd having a predetermined length is taken up with the take-up roller 27, the glass roll R is completed.

In the method of producing the glass film G according to the embodiment described above, the laser beam LB is not radiated to the glass film G at the middle position MP between the first support 21 and the second support 22, but the laser beam LB is radiated to the glass film G at a position (irradiation position O) which does not coincide with the top GT of the glass film G deformed into a convex shape, that is, at a position which is outside the shift range D of the top GT and on the first support 21 side with respect to the middle position MP. With this, the meandering of the melt-cut portion (103), which occurs when the laser beam LB is radiated to a position which coincides with the top GT of the glass film G, is prevented, and thus the glass film G can be cut with high accuracy.

Figure 7:
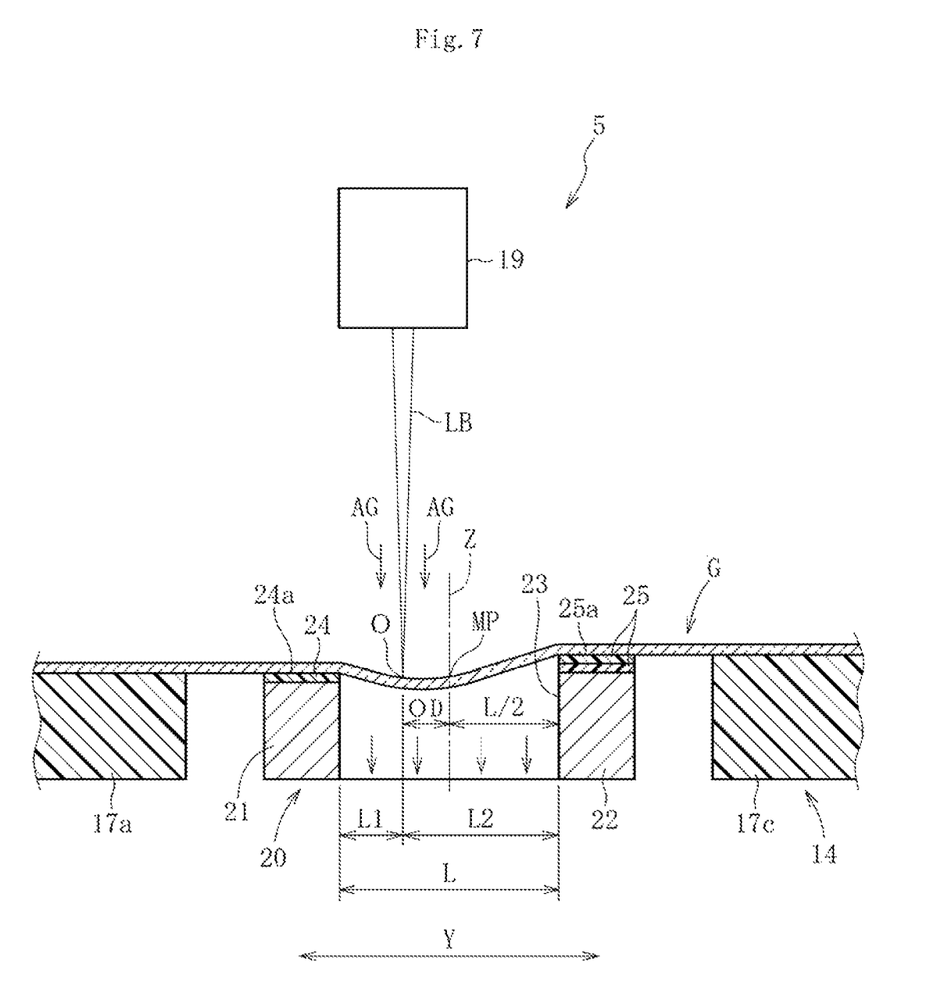
FIG. 7 is a sectional view for illustrating a main portion of an apparatus for producing a glass film according to a second embodiment.
Figure 8:
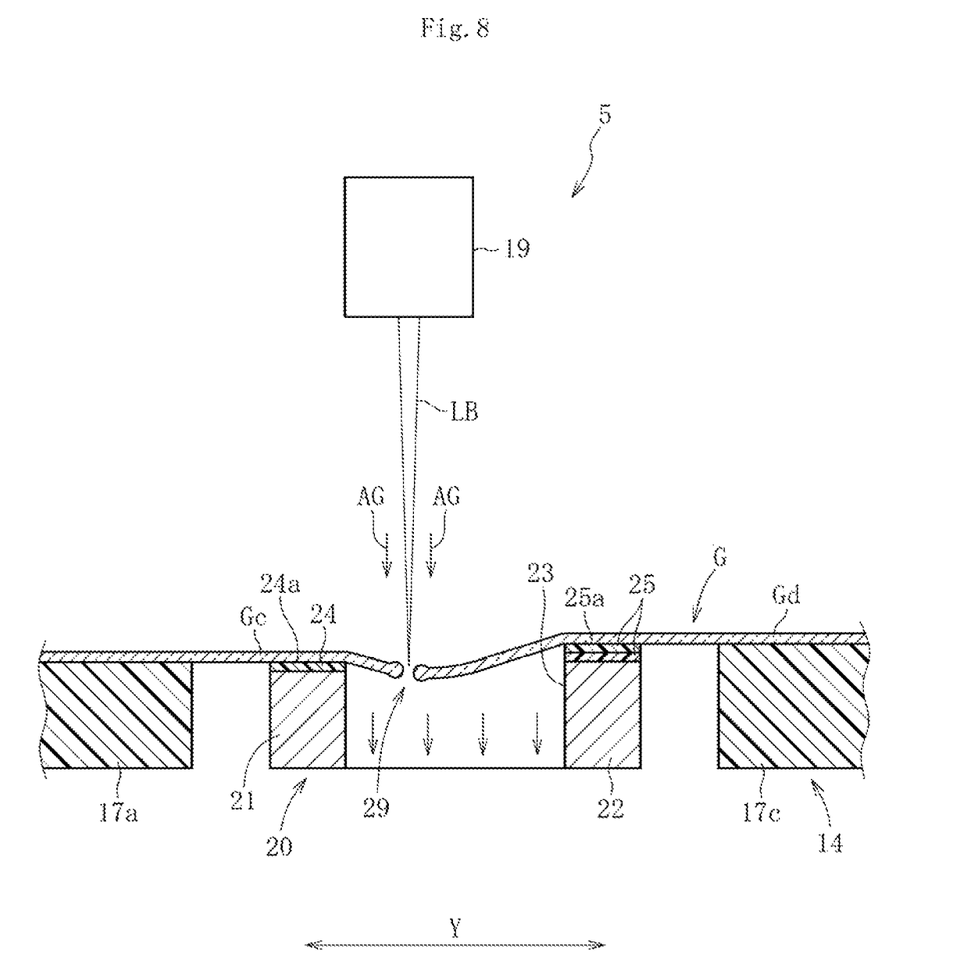
FIG. 8 is a sectional view for illustrating a state in which a glass film is melt-cut.
Figure 9:
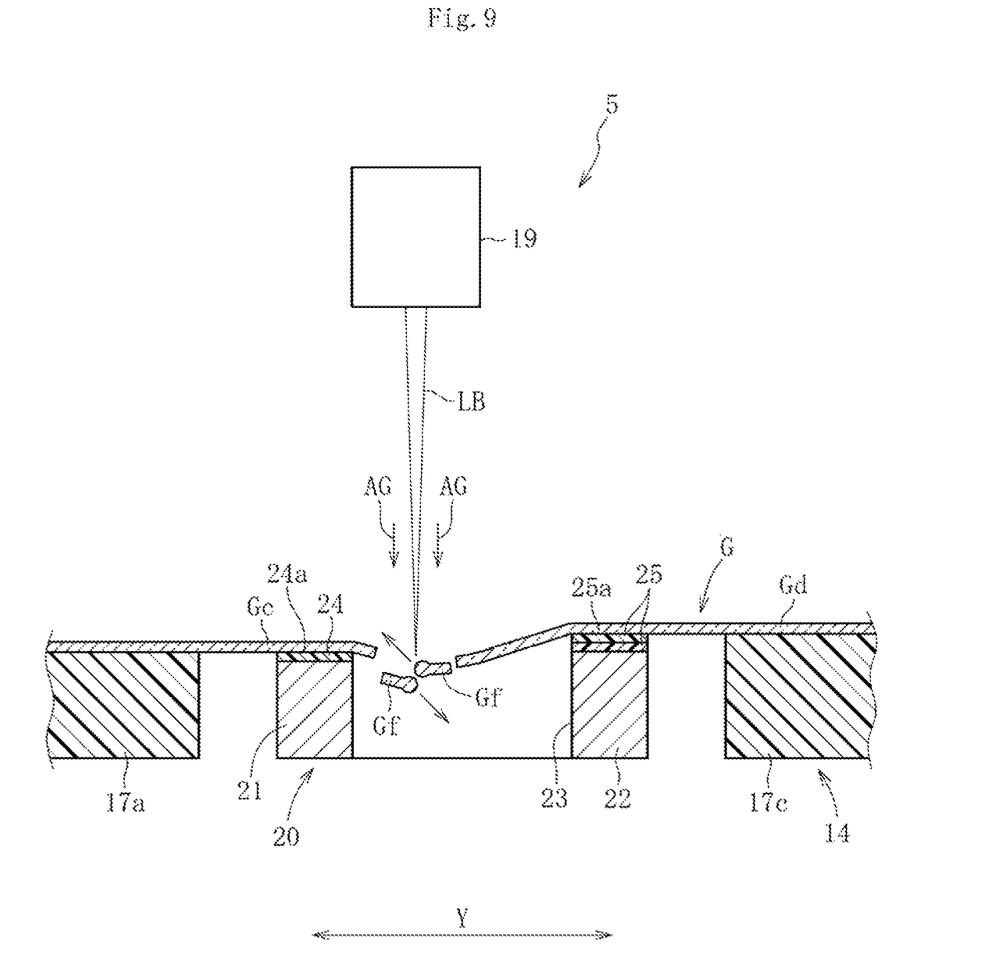
FIG. 9 is a sectional view for illustrating a state in which thread-like peeled materials are generated from a product portion and a non-product portion.

In each of FIG. 7 to FIG. 9, a method of producing a glass film according to a second embodiment is illustrated. In this embodiment, a mode of a surface plate 20 is different from that of the first embodiment. In this embodiment, as illustrated in FIG. 7, a support surface 25a of a second support 22 is configured to support a glass film G (product portion Gd) at a higher position than a support surface 24a of a first support 21.

In this embodiment, a difference in surface level between the support surface 24a of the first support 21 and the support surface 25a of the second support 22 is desirably set to about 1 mm, but is not limited thereto, and may be appropriately set depending on the thickness of the glass film G. The difference in surface level is achieved by, for example, stacking a plurality of resin sheets 25 on an upper portion of the second support 22. As in the first embodiment, the glass film G is deformed so as to be convex downward by being suctioned within a range of an opening 23. An irradiation position O of the glass film G with a laser beam LB from a laser irradiation apparatus 19 is offset to a position which is on a first support 21 side with respect to a middle position MP between the first support 21 and the second support 22 by a predetermined distance OD.

Other configurations in this embodiment are the same as in the first embodiment, and components common to those in the first embodiment are denoted by the same symbols.

A method of producing the glass film G according to this embodiment is described below. In this embodiment, the glass film G is cut through utilization of a so-called peeling phenomenon. Specifically, as in the first embodiment, while the glass film G is conveyed, the laser beam LB is radiated to the irradiation position O offset to the position on the first support 21 side to melt-cut the glass film G into a non-product portion Gc and a product portion Gd as illustrated in FIG. 8. A melt-cut portion 29 thus formed linearly develops without meandering as in the first embodiment.

The melt-cut portion 29 (see FIG. 8) is cooled when the glass film G is conveyed to a downstream side and moved away from the irradiation position O. Through the cooling, a heat strain occurs in the melt-cut portion 29, and a stress resulting therefrom acts as a tensile force in a portion not having been melt-cut. By the action, as illustrated in FIG. 9, thread-like peeled materials Gf are separated from an end portion of the non-product portion Gc in a width direction and an end portion of the product portion Gd in a width direction. The above-mentioned phenomenon in which the thread-like peeled material Gf is peeled off from an end portion of the glass film G (non-product portion Gc and product portion Gd) is generally called peeling. When the thread-like peeled material Gf is generated, a uniform cut surface is formed on the glass film G. For example, the thread-like peeled material Gf is wound around a rod-shaped collecting member or conveyed with a belt conveyor, and is thus collected without being broken.

In this embodiment, in the surface plate 20, the support surface 25a of the second support 22 is set to a higher position than the support surface 25a of the first support 21, and hence the thread-like peeled material Gf generated from the product portion Gd supported by the second support 22 can be moved upward, and the thread-like peeled material Gf generated from the non-product portion Gc supported by the first support 21 can be moved downward. That is, as illustrated in FIG. 9, the thread-like peeled material Gf generated on a product portion Gd side is located above the thread-like peeled material Gf generated on a non-product portion Gc side.

Therefore, the thread-like peeled material Gf on the non-product portion Gc side is encouraged to move below the thread-like peeled material Gf on the product portion Gd side. In addition, the thread-like peeled material Gf generated on the product portion Gd side moves upward so as to separate from the product portion Gd (so as to approach the non-product portion Gc) because there is no obstacle above the thread-like peeled material Gf. As described above, each of the thread-like peeled materials Gf moves so as to separate from a product surface (upper surface) of the product portion Gd, and hence does not damage the product portion Gd. Accordingly, by the method of producing the glass film G according to this embodiment, the glass film G can be cut with high accuracy while the product portion Gd is not damaged.

The inventors of the present invention performed a test for confirming the effects of the present invention. In the test, a band-like glass film G was prepared as Comparative Example. While the glass film G was suctioned through the opening 23 of the surface plate 20, the glass film G was cut by setting the irradiation position O of the glass film G with the laser beam LB to a position within the shift range of the position of the top GT of the glass film G deformed so as to be convex downward. In addition, a band-like glass film G was prepared as Example. While the glass film G was suctioned through the opening 23 in the same manner as in Comparative Example, the glass film G was cut by radiating the laser beam LB to a position offset so as to be outside the shift range of the position of the top GT of the glass film G deformed so as to be convex downward and on the first support 21 side.

In the test, the distance L between the first support 21 and the second support 22 of the surface plate 20 was set to 20 mm. In the test, a suction amount by the suction pump 26 was set to 500 l/min. When the glass film G is suctioned, the irradiation position O (height position) with the laser beam LB is set to a lower position as compared to the case of not suctioning the glass film G. In the test, the irradiation position O with the laser beam LB was set to a position lower than the support surface 25a of the first support 21 by 0.15 mm.

The examples were compared to each other. In the glass film G according to Comparative Example, the melt-cut portion (corresponding to the melt-cut portion 103 of FIG. 11) meandered, and a linear cut surface was not able to be obtained. In contrast, in the glass film G according to Example, the melt-cut portion 29 did not meander, and a linear cut surface was able to be obtained as compared to Comparative Example.

The present invention is not limited to the configurations of the above-mentioned embodiments. In addition, the action and effect of the present invention are not limited to those described above. The present invention may be modified in various forms within the range not departing from the spirit of the present invention.

In each of the above-mentioned embodiments, an example in which the glass film G is cut into the non-product portion Gc and the product portion Gd is presented, but the present invention is not limited thereto. It is appropriate to cut the glass film G into two or more portions, and use the whole or part thereof as the product portion Gd.

In each of the above-mentioned embodiments, an example in which the glass roll R is produced by taking up the glass film G by the take-up portion 6 is presented, but the present invention is not limited thereto. Specifically, the take-up step may be omitted, and the method of the present invention is applicable to a glass film G to be not formed into a roll shape.

In each of the above-mentioned embodiments, an example in which the irradiation position O of the glass film G with the laser beam LB is offset to a position on the first support 21 side with respect to the middle position MP is presented, but the present invention is not limited thereto. The glass film G may be melt-cut by offsetting the irradiation position O with the laser beam LB to a position on a second support 22 side with respect to the middle position MP.

In each of the above-mentioned embodiments, an example in which the support surface 25a of the second support 22 is set to a higher position than the support surface 25a of the first support 21 is presented, but the present invention is not limited thereto. For example, the support surface 25a of the first support 21 may be set to a higher position than the support surface 25a of the second support 22. Alternatively, the support surface 24a of the first support 21 and the support surface 25a of the second support 22 may be set to positions at the same height.

In each of the above-mentioned embodiments, an example in which the glass film G is cut by using the surface plate 20 comprising the first support 21, the second support 22, and the opening 23 is presented, but the present invention is not limited thereto. In the cutting step according to the present invention, the glass film G may be cut without using the surface plate 20. In this case, the glass film G is cut between the first conveyor belt 17a and the third conveyor belt 17c and between the second conveyor belt 17b and the third conveyor belt 17c in the second conveying device 14.

Specifically, the third conveyor belt 17c serves as the first support, and the first conveyor belt 17a and the second conveyor belt 17b each serve as the second support. In addition, the space between the third conveyor belt 17c and the first conveyor belt 17a and the space between the third conveyor belt 17c and the second conveyor belt 17b are each used as the opening. In addition, a position at which the glass film G is supported by the third conveyor belt 17c may be set be higher than positions at which the glass film G is supported by the first conveyor belt 17a and the second conveyor belt 17b.

In each of the above-mentioned embodiments, an example in which the glass film G is deformed so as to be convex downward by being suctioned through the opening 23 of the surface plate 20 with the suction pump 26 is presented, but the present invention is not limited thereto. The glass film G may be deformed so as to be convex downward within the range of the opening 23 by its own weight without being suctioned with the suction pump 26.

REFERENCE SIGNS LIST 19 laser irradiation apparatus
20 surface plate
21 first support
22 second support
23 opening
G glass film
Gc non-product portion
Gd product portion
Ge thread-like peeled material.
LB laser beam
O irradiation position of laser beam
MP middle position

The invention claimed is:

1. A method of producing a glass film, comprising:
a conveying step of conveying a band-like glass film in a predetermined direction with a conveying device; and
a cutting step of melt-cutting the glass film into a first portion and a second portion with a cutting portion while conveying the glass film by the conveying step, the cutting portion comprising:
  a laser irradiation apparatus;
  a first support configured to support the first portion;
  a second support configured to support the second portion; and
  an opening formed at a position between the first support and the second support and below the laser irradiation apparatus,
the cutting step comprising deforming the glass film so as to be convex downward through the opening, and radiating a laser beam from the laser irradiation apparatus to a position which is within a range of the opening, and which is prevented from coinciding with a top of the glass film.

2. The method of producing a glass film according to claim 1,
  wherein the conveying device comprises a surface plate including the first support, the second support, and the opening, and
  wherein the cutting step comprising deforming the glass film so as to be convex downward through suction at the opening.

3. The method of producing a glass film according to claim 1,
  wherein the first portion serves as a non-product portion, and the second portion serves as a product portion, and
  wherein an irradiation position of the glass film with the laser beam is offset to a position which is on a first support side, and which is prevented from coinciding with the top of the glass film.

4. The method of producing a glass film according to claim 3, wherein, when a distance between the first support and the irradiation position of the glass film with the laser beam is defined as L1, and a distance between the second support and the irradiation position of the glass film with the laser beam is defined as L2, the L1 and the L2 are set so as to satisfy the following expression: L1:L2=3:7 to 4.5:5.5.

5. The method of producing a glass film according to claim 1, wherein the cutting step further comprises, after the melt-cutting the glass film with the laser beam, generating thread-like peeled materials from an end portion of the first portion in a width direction and an end portion of the second portion in a width direction.

6. The method of producing a glass film according to claim 5, wherein the second support is configured to support the product portion at a higher position than the first support.

\* \* \* \* \*